US012730194B2

(12) United States Patent
Krause et al.

(10) Patent No.: US 12,730,194 B2
(45) Date of Patent: Sep. 8, 2026

(54) TRANSMISSION DEVICE OF AN OPTICAL DETECTION DEVICE, DETECTION DEVICE, VEHICLE, AND METHOD

(71) Applicant: Valeo Schalter und Sensoren GmbH, Bietigheim-Bissingen (DE)

(72) Inventors: Jonas Krause, Bietigheim-Bissingen (DE); Christoph Parl, Bietigheim-Bissingen (DE); Thorsten Beuth, Bietigheim-Bissingen (DE); Oleg Loginenko, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 862 days.

(21) Appl. No.: 18/018,190

(22) PCT Filed: Jul. 20, 2021

(86) PCT No.: PCT/EP2021/070231

§ 371 (c)(1),
(2) Date: Jan. 26, 2023

(87) PCT Pub. No.: WO2022/023117

PCT Pub. Date: Feb. 3, 2022

(65) Prior Publication Data

US 2023/0266442 A1 Aug. 24, 2023

(30) Foreign Application Priority Data

Jul. 27, 2020 (DE) ..................... 10 2020 119 729.2

(51) Int. Cl.
*G01C 3/08* (2006.01)
*G01S 7/481* (2006.01)
(Continued)

(52) U.S. Cl.
CPC .......... *G01S 7/4814* (2013.01); *G01S 17/931* (2020.01); *G01S 2013/93274* (2020.01)

(58) Field of Classification Search
CPC ................ G01S 7/4814; G01S 17/931; G01S 2013/93274
See application file for complete search history.

(56) References Cited

U.S. PATENT DOCUMENTS 8,072,581 B1 * 12/2011 Breiholz ................ G01S 17/89 356/5.01
2006/0227317 A1 10/2006 Henderson et al.
(Continued)

FOREIGN PATENT DOCUMENTS

CN 104678403 A 6/2015
DE 102009040325 A1 3/2011
(Continued)

OTHER PUBLICATIONS

Office Action issued in counterpart Korean Patent Application No. 10-2023-7006519 mailed Nov. 6, 2024.
(Continued)

*Primary Examiner* — Mark Hellner
(74) *Attorney, Agent, or Firm* — Osha Bergman Watanabe & Burton LLP

(57) ABSTRACT

The invention relates to a transmission device (22) of an optical detection device (12) for monitoring at least one monitoring region (14) for objects (18) using electromagnetic transmission signals (28). The invention also relates to a detection device (12), to a vehicle (10), and to a method for operating the optical detection device (12). The transmission device (22) comprises at least one signal source (32), by means of which electromagnetic transmission signals (28) can be generated, and at least one signal influencing device (34), by means of which the electromagnetic transmission signals (28) can be influenced. The at least one signal
(Continued)

influencing device (34) has at least two different optical diffuser regions (40*a*, 40*b*, 40*c*, 40*d*) which are arranged adjacently to one another when viewed at least in a direction transverse to the optical axis (36) of the at least one signal source (32) and which have different scattering properties with respect to the electromagnetic transmission signals (28).

8 Claims, 3 Drawing Sheets

(51) Int. Cl.
*G01S 17/931* (2020.01)
*G01S 13/931* (2020.01)

(56) References Cited

U.S. PATENT DOCUMENTS

| | | | | |
|---|---|---|---|---|
| 2016/0146927 | A1 | 5/2016 | Hudman | |
| 2020/0041615 | A1* | 2/2020 | Frederiksen | G01S 7/4815 |
| 2020/0072948 | A1* | 3/2020 | Nguyen | G01S 17/931 |
| 2021/0325540 | A1* | 10/2021 | Spickermann | G01S 7/4816 |

FOREIGN PATENT DOCUMENTS

| | | | | |
|---|---|---|---|---|
| DE | 102014217209 | A1 | 5/2015 | |
| DE | 102015112296 | A1 | 2/2017 | |
| DE | 102016004334 | A1 * | 10/2017 | G01S 7/4814 |
| DE | 102016118481 | A1 | 3/2018 | |
| DE | 102017105210 | A1 | 9/2018 | |
| DE | 102017116597 | A1 | 1/2019 | |
| DE | 102019103965 | A1 * | 8/2019 | G01S 17/08 |
| DE | 102018212735 | A1 | 2/2020 | |
| DE | 102018212823 | A1 | 2/2020 | |
| DE | 102018125591 | A1 | 4/2020 | |
| EP | 3637131 | A2 | 4/2020 | |
| JP | H02-306513 | A | 12/1990 | |
| JP | H11-142112 | A | 5/1999 | |
| JP | 2018-004464 | A | 1/2018 | |
| JP | 2019-113530 | A | 7/2019 | |
| JP | 2019-144072 | A | 8/2019 | |
| KR | 102046258 | B1 | 11/2019 | |
| WO | 2011026452 | A1 | 3/2011 | |

OTHER PUBLICATIONS

International Search Report and Written Opinion in corresponding International Application No. PCT/EP2021/070231, dated Oct. 20, 2021 (13 pages).

German Search Report in corresponding German Application No. 10 2020 119 729.2, dated Mar. 29, 2018 (11 pages).

Office Action issued in counterpart Japanese Patent Application No. JP 2023-505778 mailed Jan. 16, 2024 (14 pages).

Office Action in corresponding Chinese Application No. 202180054919.7, dated Nov. 29, 2025 (25 pages).

* cited by examiner

TRANSMISSION DEVICE OF AN OPTICAL DETECTION DEVICE, DETECTION DEVICE, VEHICLE, AND METHOD

TECHNICAL AREA

The invention relates to a transmission device of an optical detection device for monitoring at least one monitoring area for objects by means of electromagnetic transmitted signals, having at least one signal source, using which electromagnetic transmission signals can be generated, and having at least one signal influencing device, using which the electromagnetic transmission signals can be influenced.

In addition, the invention relates to a detection device for detecting objects in at least one monitoring area by means of electromagnetic transmission signals, having at least one transmission device, using which electromagnetic transmission signals can be transmitted into the monitoring area, having at least one receiving device, using which electromagnetic reception signals can be received, which originate from electromagnetic transmission signals that are reflected in the monitoring area, and using which electromagnetic reception signals can be converted into evaluation signals, which are processable using an evaluation device, and having at least one evaluation device, using which items of information about the monitoring area can be ascertained on the basis of at least the electromagnetic reception signals, wherein the at least one transmission device has at least one signal source, using which electromagnetic transmission signals can be generated, and at least one signal influencing device, using which the electromagnetic transmission signals can be influenced.

Furthermore, the invention relates to a vehicle having at least one detection device for detecting objects in at least one monitoring area by means of electromagnetic signals.

Moreover, the invention relates to a method for detecting objects in at least one monitoring area using a detection device by means of electromagnetic transmission signals, in which using at least one transmission device, at least one electromagnetic transmission signal is transmitted into the at least one monitoring area, wherein the at least one electromagnetic transmission signal is influenced using at least one signal influencing device, using a receiving device, at least one reception signal is received, which originates from at least one transmission signal that is reflected in the monitoring area, items of information about the monitoring area are ascertained at least on the basis of the at least one received reception signal.

PRIOR ART

An optical transmission and receiving device of an optical detection device of a vehicle is known from DE 10 2016 118 481 A1. The transmission and receiving device has at least one optical transmitter for emitting at least one transmission light beam, at least one scanning unit at least for changing the beam direction of the at least one transmission light beam, and at least one optical receiver for receiving at least one reception light beam, which are arranged relative to one another so that the at least one receiver can receive transmission light beams emitted by the at least one transmitter, which are reflected from an object or obstacle possibly present in a transmission beam path of the at least one transmitter as reception light beams. The at least one scanning unit has at least one first signal influencing device for deflecting at least one transmission light beam radiated using the at least one transmitter into the at least one scanning unit in a first direction and at least one second signal influencing device for changing a beam propagation of the at least one transmission light beam in a second direction. The at least one second signal influencing device is arranged in the beam path of the at least one transmission light beam downstream of the at least one first signal influencing device. The first direction and the second direction extend perpendicularly or obliquely with respect to one another.

The invention is based on the object of designing a transmission device, a detection device, a vehicle, and a method of the type mentioned at the outset, in which the detection of objects can be improved.

DISCLOSURE OF THE INVENTION

This object is achieved according to the invention in the case of the method in that the at least one signal influencing device, viewed at least in a direction transverse to an optical axis of the at least one signal source, has at least two different optical diffuser areas adjacent to one another, which have different scattering properties with respect to the electromagnetic transmission signals.

According to the invention, the at least one signal influencing device has multiple optical diffuser areas. The signal components of the transmission signals which are incident on the respective diffuser areas can thus be influenced using different scattering properties. In this case, they can be differently scattered, diffracted, provided with phase shifts, or influenced in another manner. The different scattering properties can effectuate different signal intensities and/or different deflections for the corresponding signal components of the transmission signals in this case. In this way, the signal components of the transmission signals can be transmitted using the diffuser areas having different signal intensities in different directions. The transmission device can thus be individually adapted to the operating conditions in which the detection device is to be operated. The detection of objects can thus be operated more efficiently. The at least one signal influencing device can already be individually adapted during the production of the detector device and/or the installation at the installation location, in particular in or on a vehicle.

The detection device can advantageously be modularly constructed. Different signal influencing devices can thus be provided, which can be used modularly in particular in the production of the detection device. In this way, the detection device can be individualized more easily.

The signal components of a transmission signal relate to the respective profile of the transmission signal transverse to its propagation direction, in particular transverse to the optical axis of the signal source.

The main propagation direction of a transmission signal downstream of the signal source can advantageously extend in parallel or axially to the optical axis of the signal source.

The operating conditions can advantageously be an installation location of the detection device, in particular in or on a vehicle, and/or the alignment of the detection device. In particular distances to delimitations in the at least one monitoring area can thus be taken into consideration. In particular, the at least one monitoring area can be delimited in one direction by the ground. In addition, vehicle parts can be taken into consideration, which are located within the at least one monitoring area and delimit the detection range.

At least one diffuser area can advantageously expand the signal components of the transmission signals incident thereon. In this way, a correspondingly larger field of view can be illuminated simultaneously.

The items of information about the monitoring area can advantageously involve items of object information of objects in the monitoring area, in particular distances, directions, and/or velocities of objects relative to the detection device. In addition, the items of information about the monitoring area can also include the information that no object is detected. Moreover, the items of information about the monitoring area can also include that a detection range is delimited in particular by visual impairments, such as fog, precipitation, or the like.

Advantageously, the optical detection device can operate according to a signal time-of-flight method. Optical detection devices operating according to the signal time-of-flight method can be embodied and referred to as time-of-flight systems (TOF), light detection and ranging systems (LiDAR), laser detection and ranging systems (LaDAR) or the like. The distance can be ascertained from the signal time-of-flight.

The detection device can advantageously be embodied as a so-called flash system, in particular as flash LiDAR. At least one transmission signal can be emitted using at least one signal source here, which irradiates all diffuser areas of the at least one signal influencing device simultaneously. On the exit side of the at least one signal influencing device, the corresponding influenced signal components of the at least one transmission signal can simultaneously radiate over a part of the at least one monitoring area or the entire at least one monitoring area.

Alternatively, the detection device can be embodied as a scanning system. The diffuser areas and thus the at least one monitoring area can be successively scanned here using transmission signals. For this purpose, the propagation direction of the transmission signals can be pivoted over the diffuser areas. In this case, at least one deflection device, in particular a scanning device, a deflection mirror device, or the like can be used.

Advantageously, the detection device can be embodied as a laser-based distance measuring system. The laser-based distance measuring system can have at least one laser, in particular a diode laser, as the signal source of the at least one transmission device. The at least one laser can be used to transmit in particular pulsed transmission beams as transmission signals. The laser can be used to emit transmission signals in wavelength ranges that are visible or not visible to the human eye. Accordingly, at least one receiver of at least one receiving device can have a sensor designed for the wavelength of the emitted light, in particular a line sensor or area sensor, in particular an (avalanche) photodiode, a photodiode linear array, a CCD sensor, an active pixel sensor, in particular a CMOS sensor, or the like. The laser-based distance measurement system can advantageously be a laser scanner. A laser scanner can scan a monitoring area using an in particular pulsed laser beam.

The invention can advantageously be used in a vehicle, in particular a motor vehicle. The invention can advantageously be used in a land-based vehicle, in particular an automobile, a truck, a bus, a motorcycle or the like, an aircraft, in particular drones, and/or a watercraft. The invention can also be used in vehicles that can be operated autonomously or at least partially autonomously. However, the invention is not restricted to vehicles. It can also be used in stationary operation and/or in robotics.

The detection device can advantageously be connected to at least one electronic control device of the vehicle, in particular a driver assistance system and/or a chassis control system and/or a driver information device and/or a parking assistance system and/or a gesture recognition or the like or can be part of such a device or system. In this way, at least a part of the functions of the vehicle can be operated autonomously or partially autonomously.

The detection device can be used to detect stationary or moving objects, in particular vehicles, persons, animals, plants, obstacles, roadway irregularities, in particular potholes or rocks, roadway boundaries, traffic signs, free spaces, in particular free parking spaces, or precipitation or the like.

In an advantageous embodiment, at least one diffuser area can have at least one scattering means or can consist thereof, using which electromagnetic transmission signals can be scattered, and/or at least one diffuser area can have at least one diffraction means or can consist thereof, using which electromagnetic transmission signals can be diffracted, and/or at least one diffuser area can have at least one diffractive optical structure, using which scattering properties with respect to the electromagnetic transmission signals can be predetermined. The signal components of the transmission signals which are incident on a diffuser area can be deliberately scattered using scattering means and/or diffraction means. The directions and/or the signal intensity of the transmission signals on the exit side of the at least one signal influencing device can thus be deliberately influenced.

As is known, diffractive optical structures are structures at which light beams, in particular transmission signals, can be shaped. This is accomplished in the form of diffraction at optical gratings. In this case, the diffractive optical structures can be designed individually. They can be implemented in a manner such that the beam direction of an incident light beam is accordingly changed by the diffractive optical structure in dependence on the angle of incidence and/or a point of incidence on the diffractive optical structure. Diffractive optical structures can be operated in transmission and/or reflection.

Advantageously, at least one diffuser area can have at least one diffractive optical element or can consist thereof.

In a further advantageous embodiment, at least two different optical diffuser areas can be associated with at least two different regions of the monitoring area. In this way, the transmission signals which are incident on the respective diffuser areas can be guided using the corresponding scattering properties in the corresponding region. In this way, a better individual adaptation of the transmission device to the existing operating condition or the operating condition to be expected of the detection device can be implemented.

In a further advantageous embodiment, the transmission device can implement respective signal intensities for the at least two different regions. In this way, the transmission signals can each be transmitted proportionally at the required signal intensity in the respective regions. The signal intensity can be adapted to the detection range in the corresponding region. A greater signal intensity is required for a greater detection range than for a lesser detection range. The signal intensities can thus be deliberately adapted to the surrounding conditions. In regions in which the detection range is limited in any case, in particular by obstacles, for example the ground, or the like, a lesser signal intensity is required. The overall signal intensity of the transmission signals which is generated by the at least one signal source can thus be expediently divided onto the regions of the monitoring area.

In a further advantageous embodiment, in at least two orthogonal directions viewed transversely to the optical axis of the at least one signal source, at least two different optical diffuser areas can be arranged adjacent to one another. In this way, the signal components of the transmission signals can be deliberately associated with the regions of the monitoring area in two spatial directions transverse to the optical axis.

If the detection device is used in conjunction with a vehicle, the scattering properties of the diffuser areas can advantageously be predetermined in dependence on a possible operating situation, in particular a driving situation, of the vehicle. In this way, the efficiency of the measurements using the detection device can be improved.

For a near field region in the vicinity of the vehicle, the signal intensity of the corresponding signal component of the transmission signal can be limited by means of the corresponding scattering property of the associated diffuser area.

For a journey of the vehicle, a detection range in the order of magnitude of 100 m or more can be predetermined for a monitoring area in the travel direction in front of the vehicle for a far field region of the monitoring area. The signal intensity of the corresponding signal component can be increased using the corresponding diffuser area. In this way, objects in front of the vehicle, in particular leading vehicles, can be recognized early.

The detection range in a region can also be limited by operation-related obstacles. Advantageously, in a detection device of the vehicle, the diffuser areas which are associated with the ground can have corresponding scattering properties, by means of which the signal intensity of the corresponding signal component of the transmission signals is reduced in the corresponding region, in particular a ground region, of the monitoring area.

The diffuser areas which are associated with regions of the monitoring area above the vehicle can be predetermined so that the corresponding signal components of the transmission signals are transmitted at a lower signal intensity using them. Objects which are located above the vehicle height are of lesser interest, since they generally do not pose a risk of collision.

Furthermore, the object is achieved according to the invention in the case of the detection device in that the at least one signal influencing device has at least two different optical diffuser areas adjacent to one another viewed in a direction transverse to an optical axis of the at least one signal source, which have different scattering properties with respect to the electromagnetic transmission signals.

In one advantageous embodiment, at least one transmission device can be a flash transmission device. In this way, at least one transmission signal can be transmitted simultaneously into multiple regions of the monitoring area. The corresponding regions can thus be checked simultaneously during a measurement.

Furthermore, the object is achieved according to the invention in the case of the vehicle in that the vehicle has at least one detection device having at least one transmission device according to the invention.

Moreover, the object is achieved according to the invention in the case of the method in that the at least one transmission signal is transmitted using the at least one transmission source onto at least one of at least two diffuser areas of the at least one signal influencing device and at least the signal component of the at least one transmission signal which is incident on the at least one diffuser area is scattered in dependence on the scattering properties of the at least one diffuser area.

According to the invention, at least one signal component of the at least one transmission signal is influenced using the corresponding at least one diffuser area. At least the signal components of the at least one transmission signal can be changed in this case with respect to the signal intensity and/or the propagation direction. The at least one transmission signal can thus be at least proportionally associated with corresponding regions of the monitoring area. The signal intensity can be adapted in this case to the corresponding region. Regions for which a large detection range is required, in particular in the far field, can thus deliberately be scanned using signal components of the transmission signal having correspondingly elevated signal intensity.

Moreover, the features and advantages indicated in conjunction with the transmission device according to the invention, the detection device according to the invention, the vehicle according to the invention, and the method according to the invention, and the respective advantageous embodiments thereof apply here in a mutually corresponding manner and vice versa. The individual features and advantages can of course be combined with one another, wherein further advantageous effects that go beyond the sum of the individual effects may emerge.

BRIEF DESCRIPTION OF THE DRAWINGS

Further advantages, features and details of the invention will become apparent from the following description, in which exemplary embodiments of the invention are explained in greater detail with reference to the drawing. A person skilled in the art will also expediently consider individually the features that have been disclosed in combination in the drawing, the description and the claims and combine them to form meaningful further combinations. Schematically, in the figures

In the figures, identical components are provided with identical reference signs.

EMBODIMENT(S) OF THE INVENTION

Figure 1:
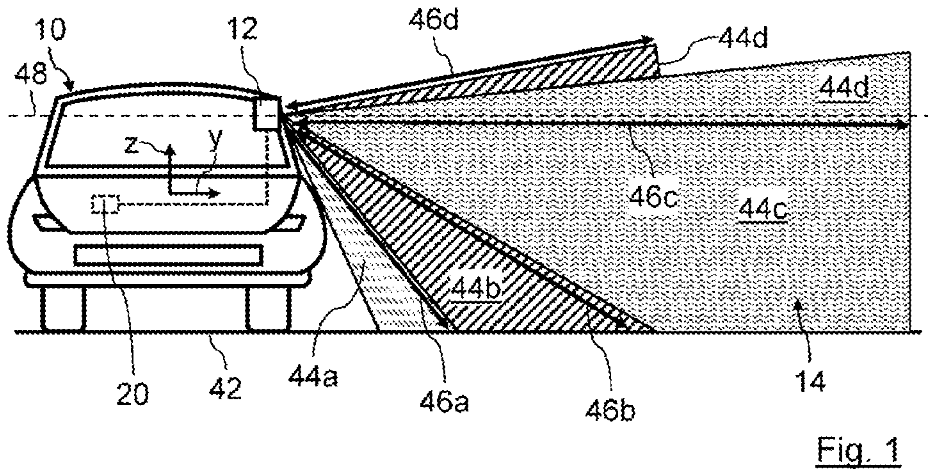
FIG. 1 shows a front view of a vehicle having a driver assistance system and a LiDAR system for monitoring a monitoring area to the left adjacent to the vehicle in the direction of travel.
Figure 2:
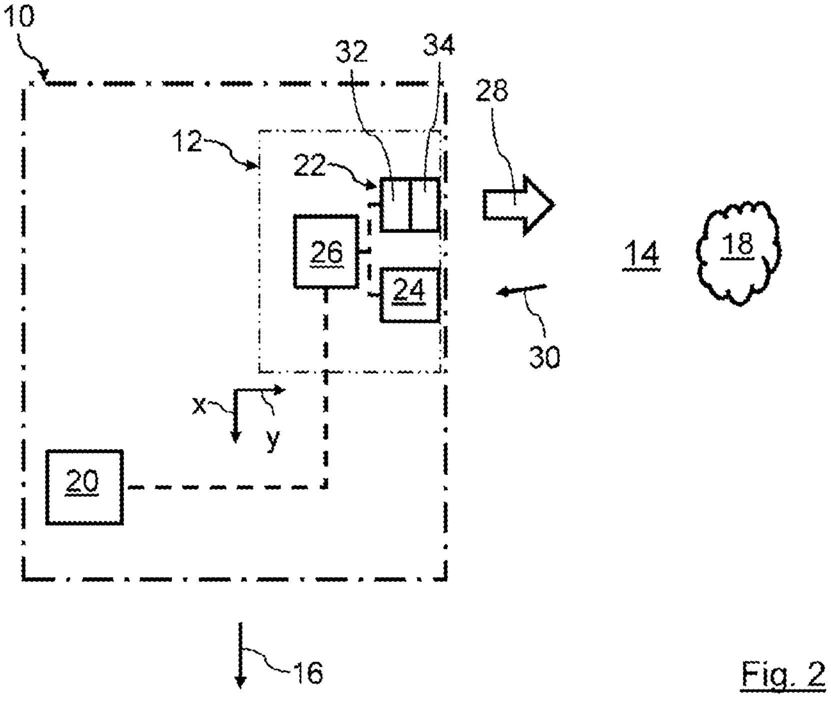
FIG. 2 shows a functional illustration of the vehicle from FIG. 1 having the driver assistance system and the LiDAR system.

FIG. 1 shows a front view of a vehicle 10 by way of example in the form of a passenger vehicle. FIG. 2 shows a functional illustration of the vehicle 10.

For better orientation, the corresponding coordinate axes of a Cartesian x-y-z coordinate system are shown in FIGS. 1 to 5. In the exemplary embodiments shown, for example, the x axis extends in the direction of a vehicle longitudinal axis of the vehicle 10, the y axis extends along a vehicle transverse axis, and the z axis extends perpendicularly to the x-y plane along a vehicle vertical axis spatially upward. When the motor vehicle 10 is located in operation on a horizontal roadway, the x axis and y axis extends spatially horizontally and the z axis extends spatially vertically.

The vehicle 10 has an optical detection device, for example, in the form of a LiDAR system 12. The LiDAR system 12 is arranged, for example, laterally in an upper area of the vehicle 10 and is oriented into a monitoring area 14, which is located on the left adjacent to the vehicle 10 in the travel direction 16. The LiDAR system 12 can be used to monitor the monitoring area 14 for objects 18. The LiDAR system 12 can also be arranged and oriented differently at another location on the vehicle 10. The vehicle 10 can also have multiple different detection devices.

The LiDAR system 12 can detect stationary or moving objects 18, for example vehicles, persons, animals, plants, obstacles, roadway irregularities, in particular potholes or rocks, roadway boundaries, traffic signs, free spaces, in particular free parking spaces, precipitation, or the like.

Furthermore, the vehicle 10 has a driver assistance system 20. Functions of the vehicle 10 can be operated autonomously or partially autonomously using the driver assistance system 20. The driver assistance system 20 is functionally connected to the LiDAR system 12. Items of information about the monitoring area 14 which are detected using the LiDAR system 12 can thus be transmitted to the driver assistance system 20. The items of information about the monitoring area 14 can be used by the driver assistance system 20, for example, to assist operating functions of the vehicle 10, for example with respect to drive, steering, and brakes.

Items of information about the monitoring area 14 can include, for example, items of information about whether objects 18 are located in the monitoring area 14. If an object 18 is detected in the monitoring area 14, the items of information about the monitoring area 14 can comprise items of object information about the detected object 18. The items of object information of an object 18, which can be ascertained using the LiDAR system 12, comprise, for example, distances, velocities, and directions of objects 18 relative to the vehicle 10 or to the LiDAR system 12, respectively. The direction of an object 18 can be specified, for example, as an angle in relation to reference axes. For example, the azimuth in relation to the vehicle transverse axis of the vehicle 10 and the elevation in relation to the vehicle vertical axis can be specified to characterize the direction.

The LiDAR system 12 comprises, for example, a transmission device 22, a receiving device 24, and an electronic control and evaluation device 26.

Electromagnetic transmission signals 28 can be transmitted using the transmission device 22. The transmission signals 28 are, for example, pulsed laser beams having wavelengths, for example, in the near infrared.

For example, the LiDAR system 12 is a so-called flash LiDAR system, in which a larger area is illuminated using a transmission signal 28.

Using the receiving device 24, the transmission signals 28, which are reflected in the monitoring area 14, for example, on an object 18 in the direction of the LiDAR system 12, can be converted as electromagnetic reception signals 30 into corresponding electrical evaluation signals. The electrical evaluation signals can be transmitted to the electronic control and evaluation device 26 of the LiDAR system 12 and processed thereby.

The control and evaluation device 26 comprises means for controlling the LiDAR system 12 and for processing the electrical evaluation signals. Alternatively, the means for control and the means for evaluation can also be embodied separately. A control device and an evaluation device can be implemented separately from one another. The means for control and for evaluation are implemented in software and in hardware. Parts of the control and evaluation device 26 or the entire control and evaluation device 26 can also be combined with an electronic control device of the vehicle 10, for example also with the driver assistance system 20.

The information about the monitoring area 14 or the items of object information about the detected object 18, respectively, can be obtained from the reception signals 30 or the electrical evaluation signals, respectively, using the LiDAR system 12. Thus, for example, according to a signal time-of-flight method, in which the time-of-flight between the transmission of a transmission signal 28 and the reception of the corresponding reception signal 30 is ascertained, the distance of the object 18 relative to the LiDAR system 12 can be ascertained.

Figure 3:
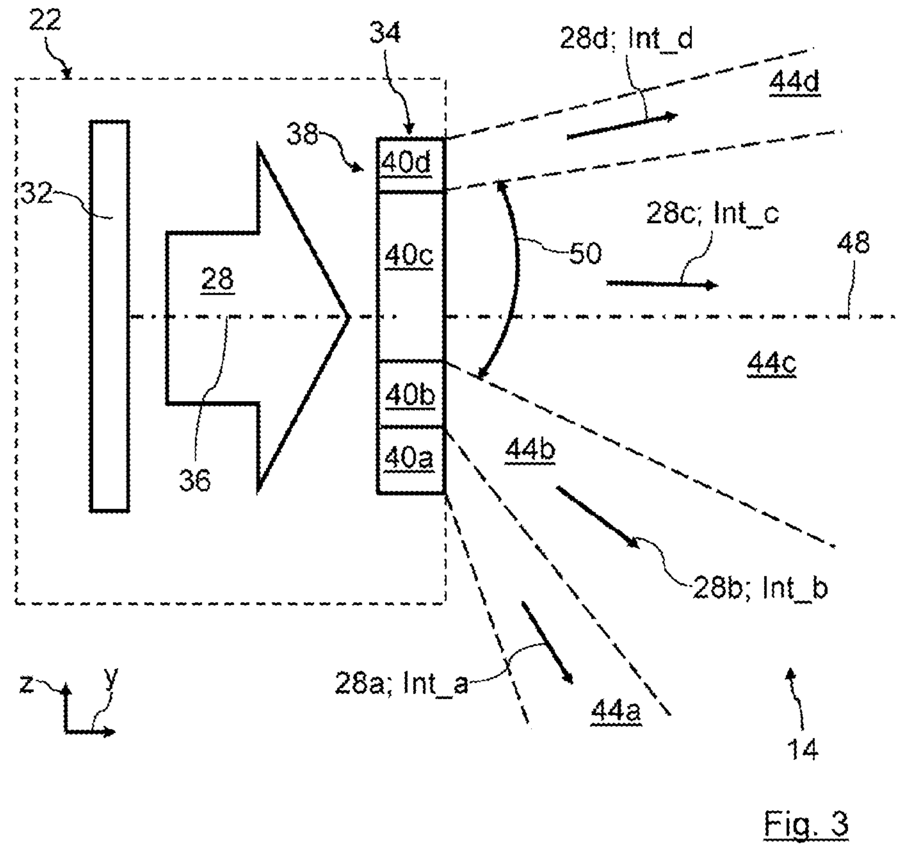
FIG. 3 shows a detail view of a transmission device of the LiDAR system in the front view of the vehicle from FIG. 1.

The transmission device 22 is not shown to scale and is not shown at the correct angle in detail by way of example in the direction of the x axis in FIG. 3. The transmission device 22 comprises a signal source 32 and a signal influencing device 34.

The signal source 32 comprises, for example, a laser diode, using which the transmission signals 28 can be generated. The transmission device 22 can also have more than one signal source 32, for example, multiple laser diodes. The transmission signals 28 are transmitted in the direction of an optical axis 36 of the signal source 32 to the signal influencing device 34. The optical axis 36 extends, for example, in parallel to the y axis, thus in parallel to the vehicle transverse axis. The extension of the transmission signals 28 transversely to the optical axis 36, thus transversely to the propagation direction thereof, is predetermined so that the transmission signals 28 completely illuminate an entry side 38 of the signal influencing device 34. The propagation direction of the transmission signals 28 downstream of the signal source 32 and upstream of the signal influencing device 34 is indicated by the arrow symbol in FIG. 3.

The signal influencing device 34 is implemented, for example, as a diffractive optical structure. The diffractive optical structure can be individually adapted to the operating requirements of the LiDAR system 12.

The signal influencing device 34 comprises, for example, four diffuser areas, viewed from bottom to top in FIG. 3, a ground diffuser area **40*a*, a near field diffuser area 40*b*, a far field diffuser area 40*c*, and a height diffuser area 40*d*. The diffuser areas 40*a*, 40*b*, 40*c*, and 40*d* each extend transversely to the optical axis 36, for example, in parallel to the x-z plane. The diffuser areas 40*a*, 40*b*, 40*c*, and 40*d* are arranged adjacent to one another viewed in the direction of the z axis, and one over another in the illustration in FIG. 3. The diffuser areas 40*a*, 40*b*, 40*c*, and 40*d*** each extend over the same width in parallel to the x axis and with different heights in parallel to the z axis.

The diffuser areas **40*a*, 40*b*, 40*c*, and 40*d*** have different scattering properties with respect to the transmission signals

28. For example, the transmission signals 28 can be deflected in different ways using the diffuser areas 40*a*, 40*b*, 40*c*, and 40*d*.

The component of the transmission signals 28 which is incident on the ground diffuser area 40*a* in FIG. 3 is diffracted by the corresponding diffractive optical structure as the ground signal component 28*a* downward toward the ground 42, for example toward the roadway, and expanded in the vertical direction, thus in the direction parallel to the z axis. The ground signal component 28*a* illuminates a ground region 44*a* of the monitoring area 14. The ground region 44*a* is delimited by the ground 42 and extends up to a ground detection range 46*a*, which is shown in FIG. 1, of approximately 2 m, for example, which approximately corresponds to the height of the vehicle 10. In addition, a ground signal intensity Int_a of the ground signal component 28*a* is set using the ground diffuser area 40*a* so that it is sufficient to illuminate the ground area 44*a* up to the ground detection range 46*a*.

A respective detection range is the distance from the LiDAR system 12 up to which the LiDAR system 12 can detect possible objects 18. The detection range can be predetermined, for example, by the length of a measurement window within which the reflection of an emitted transmission signal is expected.

The component of the transmission signals 28 which is incident on the near field diffuser area 40*b* is also diffracted by the corresponding diffractive optical structure as the near field signal component 28*b* in the direction of the ground 42 in a near field region 44*b*, which is located adjacent to the ground region 44*a*, and expanded in the vertical direction. The near field signal component 28*b* illuminates the near field region 44*b* of the monitoring area 14. The near field region 44*b* is delimited in the ground 42 and extends up to a near field detection range 46*b* of, for example, approximately 10 m. In addition, a near field signal intensity Int_b of the near field signal component 28*b* is set using the near field diffuser area 40*b* so that it is sufficient to illuminate the near field region 44*b* up to the near field detection range 46*b*. Since the near field detection range 46*b* is greater than the ground detection range 46*a*, the near field signal intensity Int_b is accordingly greater than the ground signal intensity Int_a.

The component of the transmission signals 28 which is incident on the far field diffuser area 40*c* is diffracted by the corresponding diffractive optical structure as the far field signal component 28*c* in a far field region 44*c* and expanded in the vertical direction. The far field signal component 28*c* illuminates the far field region 44*c* of the monitoring area 14. The far field region 44*c* extends adjacent to the vehicle 10 up to a far field detection range 46*c* of, for example, approximately 40 m. The far field region 44*c* extends above and below a main axis 48 of the LiDAR system 12. The main axis 48 extends, for example, in parallel to the y axis, in general spatially horizontal. The far field region 44 has, for example, a vertical opening angle 50 of approximately 25°. In addition, a far field signal intensity Int_c of the far field signal component 28*c* is set using the far field diffuser area 40*c* so that it is sufficient to illuminate the far field region 44*c* up to the far field detection range 46*c*. Since the far field detection range 46*c* is greater than the near field detection range 46*b*, the far field signal intensity Int_c is accordingly greater than the near field signal intensity Int_b.

The component of the transmission signals 28 which is incident on the height diffuser area 40*d* is diffracted by the corresponding diffractive optical structure as the height signal component 28*d* diagonally upward in a height region 44*d* and expanded in the vertical direction. The height region 44*b* is located above the far field region 44*c*. The height signal component 28*d* illuminates the height region 44*d* of the monitoring area 14. The height region 44*d* extends up to a height detection range 46*d* of, for example, approximately 10 m. A greater detection range is not required for the height region 44*d*, since possible objects 18 in the height region 44*d* are located above the vehicle 10 and there is no risk of collision. In general, there is therefore also no interest in detecting objects 18 which are located at a distance greater than 10 m in this height. In addition, a height signal intensity Int_d of the height signal component 28*d* is set using the height diffuser area 40*d* so that it is sufficient to illuminate the height region 44*d* up to the height detection range 46*d*. Since the height detection range 46*d* is approximately as large as the near field detection range 46*b*, the height signal intensity Int_d is accordingly approximately as large as the near field signal intensity Int_b.

Figure 4:
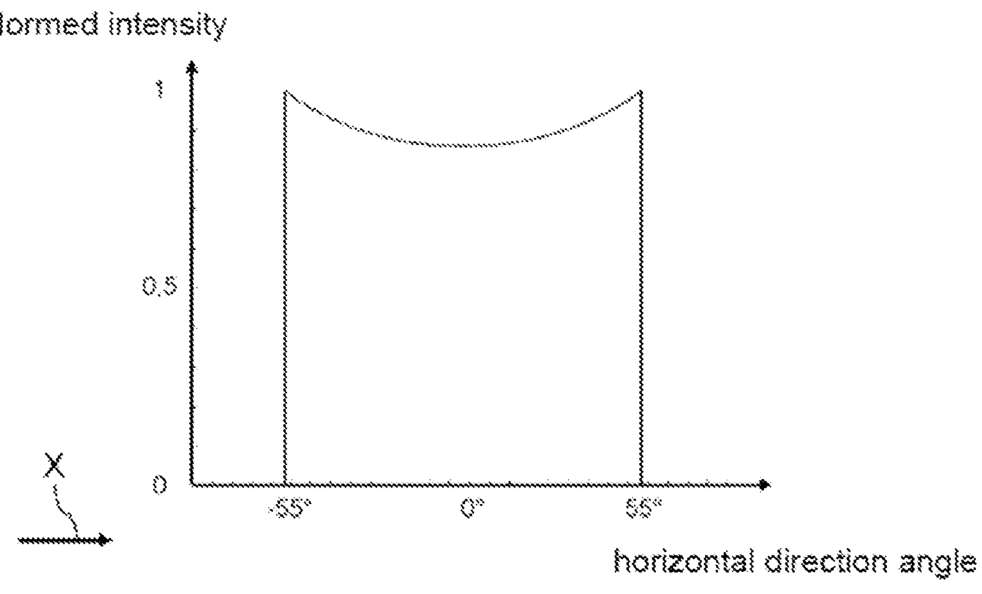
FIG. 4 shows an intensity-angle diagram, in which a normed horizontal intensity profile of transmission signals, which are transmitted using a transmission device of the LiDAR system from FIGS. 1 and 2, is shown over the horizontal directional angle in relation to a main axis of the LiDAR system.

An intensity-angle diagram is shown by way of example in FIG. 4, in which a normed horizontal intensity profile of a transmission signal 28 scattered using the signal influencing device 34 is shown over a horizontal directional angle in relation to the main axis 48 of the LiDAR system 12. The main axis 48 is at the horizontal directional angle 0°. The horizontal opening angle of the LiDAR system 12 is, for example, approximately 110°. The normed horizontal intensity profiles of the ground signal intensity Int_a, the near field signal intensity Int_b, the far field signal intensity Int_c, and the height signal intensity Int_d are identical by way of example and each correspond to the illustration in FIG. 4.

Figure 5:
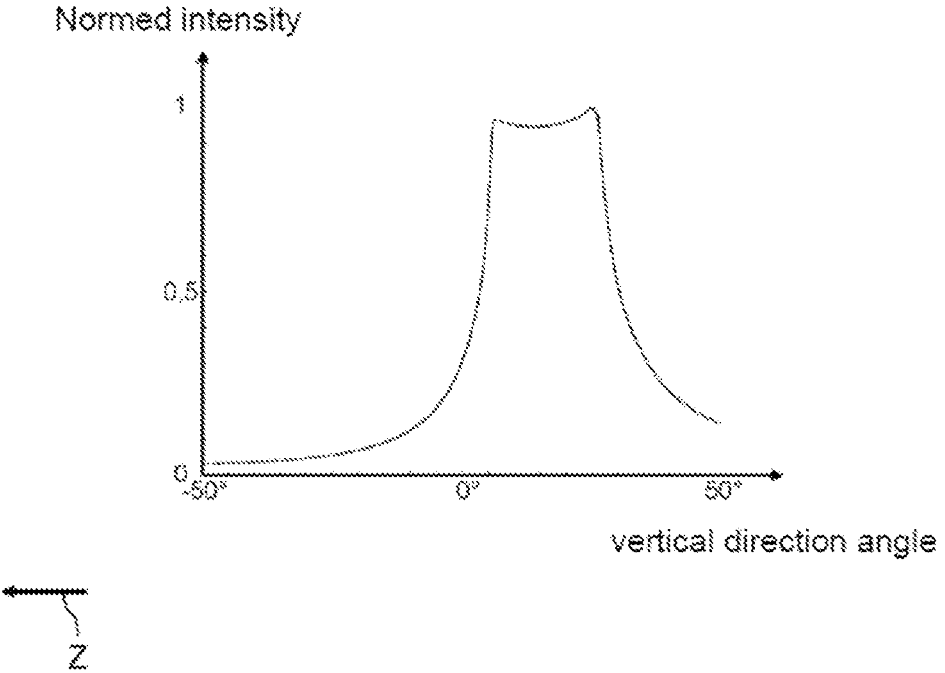
FIG. 5 shows an intensity-angle diagram, in which a normed vertical intensity profile of transmission signals, which are transmitted using a transmission device of the LiDAR system from FIGS. 1 and 2, is shown over the vertical directional angle in relation to the main axis of the LiDAR system.

An intensity-angle diagram is shown by way of example in FIG. 5, in which a normed vertical intensity profile of a transmission signal 28 scattered using the signal influencing device 34 is shown over a vertical directional angle in relation to the main axis 48 of the LiDAR system 12. The main axis 48 is at the vertical directional angle 0°, for example. The vertical opening angle of the LiDAR system 12 is, for example, approximately 80°. The normed vertical intensity profile is composed of the respective intensity profiles of the ground signal intensity Int_a, the near field signal intensity Int_b, the far field signal intensity Int_c, and the height signal intensity Int_d. The normed vertical intensity profile has its maxima approximately between the vertical direction angles 5° and 30°. The extension of the maxima over the angle range corresponds to the opening angle 50 of the far field region 44 of approximately 25°.

The receiving device 24 has an optical imaging system, for example in the form of an optical lens, a receiver, for example in the form of a CCD chip, and electronic components. The optical system is located between the receiver 24 and the monitoring area 14.

In the method for detecting objects 18 in the monitoring area 14, transmission signals 28 are generated using the transmission device 22 and transmitted onto the signal influencing device 34. Using the diffuser areas, namely the ground diffuser area 40*a*, the near field diffuser area 40*b*, the far field diffuser area 40*c*, and the height diffuser area 40*d*, the corresponding components of the transmission signals 28 are scattered and guided as the ground signal component 28*a*, near field signal component 28*b*, far field signal component 28*c*, and height signal component 28*d* with the respective intensities, namely the ground signal intensity Int_a, the near field signal intensity Int_b, the far field signal intensity Int_c, and the height signal intensity Int_d, respectively, into the corresponding region of the monitoring area

14, namely into the ground region 44*a*, the near field region 44*b*, the far field region 44*c*, and the height region 44*d*, respectively.

The ground signal components 28*a*, near field signal components 28*b*, far field signal components 28*c*, and height signal components 28*d*, which are incident on an object 18 in the monitoring area 14, are correspondingly reflected, received as corresponding reception signals 30 using the receiving device 24, and converted into electrical evaluation signals. The electrical evaluation signals are transmitted to the control and evaluation device 26. The items of object information of the object 18, specifically the distance, the direction, and the velocity of the detected object 18 relative to the LiDAR system 12, are ascertained from the evaluation signals using the control and evaluation device 26.

The items of object information are transmitted to the driver assistance system 20. Corresponding operating functions of the vehicle 10 are influenced on the basis of the items of object information using the driver assistance system 20, for example controlled or regulated. The vehicle 10 can thus be operated autonomously or partially autonomously.

The invention claimed is:

1. A transmission device of an optical detection device for monitoring at least one monitoring area for objects by electromagnetic transmission signals, the transmission device comprising:

at least one signal source configured to generate the electromagnetic transmission signals; and at least one signal influencing device configured to influence the electromagnetic transmission signals, wherein the at least one signal influencing device, when viewed in a direction transverse to an optical axis of the at least one signal source, has a plurality of different optical diffuser areas adjacent to one another, which have different scattering properties with respect to the electromagnetic transmission signals, wherein the plurality of different optical diffuser areas comprises:

a ground diffuser area configured to diffract at least some components of the electromagnetic transmission signals as ground signal components with a first intensity:

a near field diffuser area configured to diffract at least some components of the electromagnetic transmission signals as near field components with a second intensity greater than the first intensity:

a far field diffuser area configured to diffract at least some components of the electromagnetic transmission signals as far field components with a third intensity greater than the second intensity, and a height diffuser area configured to diffract at least some components of the electromagnetic transmission signals as height field components with a fourth intensity equal to the second intensity.

2. The transmission device as claimed in claim 1, wherein at least one of the plurality of different optical diffuser areas has at least one scattering means configured to scatter the electromagnetic transmission signals, or wherein the at least one of the plurality of different optical diffuser areas has at least one diffraction means configured to diffract the electromagnetic transmission signals, or wherein at least one of the plurality of different optical diffuser areas has at least one diffractive optical structure configured with predetermined scattering properties with respect to the electromagnetic transmission signals.

3. The transmission device as claimed in claim 1, wherein the plurality of different optical diffuser areas are associated with a plurality of different regions of the at least one monitoring area.

4. The transmission device as claimed in claim 1, wherein, viewed in plurality of orthogonal directions transverse to the optical axis of the at least one signal source, the plurality of different optical diffuser areas are arranged adjacent to one another.

5. A detection device for detecting objects in at least one monitoring area by electromagnetic transmission signals, the detection device comprising:

at least one transmission device configured to transmit the electromagnetic transmission signals into the monitoring area;

at least one receiving device configured to:

receive electromagnetic reception signals that originate from electromagnetic transmission signals that are reflected in the monitoring area, and convert the electromagnetic reception signals into evaluation signals, an evaluation device configured to process the evaluation signals and ascertain items of information about the monitoring area based on the electromagnetic reception signals, wherein the at least one transmission device has at least one signal source configured to generate the electromagnetic transmission signals, and at least one signal influencing device configured to influence the electromagnetic transmission signals, wherein the at least one signal influencing device, when viewed in a direction transverse to an optical axis of the at least one signal source, has plurality of different optical diffuser areas adjacent to one another, which have different scattering properties with respect to the electromagnetic transmission signals, and wherein the plurality of different optical diffuser areas comprises:

a ground diffuser area configured to diffract at least some components of the electromagnetic transmission signals as ground signal components with a first intensity;

a near field diffuser area configured to diffract at least some components of the electromagnetic transmission signals as near field components with a second intensity greater than the first intensity;

a far field diffuser area configured to diffract at least some components of the electromagnetic transmission signals as far field components with a third intensity greater than the second intensity, and a height diffuser area configured to diffract at least some components of the electromagnetic transmission signals as height field components with a fourth intensity equal to the second intensity.

6. The detection device as claimed in claim 5, wherein the at least one transmission device is a flash transmission device.

7. A vehicle comprising: at least one detection device for detecting the objects in the at least one monitoring area by the electromagnetic transmission signals, and the detection device having the at least one transmission device as claimed in claim 1.

8. A method for detecting objects in at least one monitoring area using a detection device by electromagnetic transmission signals, the method comprising:

transmitting at least one electromagnetic transmission signal into the at least one monitoring area using at least one transmission device, influencing the at least one electromagnetic transmission signal with at least one signal influencing device, receiving, with a receiving device, at least one reception signal which originates from at least one transmission signal that is reflected in the monitoring area, ascertaining items of information about the monitoring area based on the at least one received reception signal, wherein the at least one transmission signal is transmitted, using the at least one transmission device, onto a plurality of different optical diffuser areas of the at least one signal influencing device and, wherein components of the at least one transmission signal that are incident on a first optical diffuser area of the plurality of different optical diffuser areas are scattered depending on scattering properties of the first diffuser area, wherein the plurality of different optical diffuser areas comprises:

a ground diffuser area that diffracts at least some of the components of the electromagnetic transmission signals as ground signal components with a first intensity;

a near field diffuser area that diffracts at least some of the components of the electromagnetic transmission signals as near field components with a second intensity greater than the first intensity;

a far field diffuser area that diffracts at least some of the components of the electromagnetic transmission signals as far field components with a third intensity greater than the second intensity, and a height diffuser area that diffracts at least some of the components of the electromagnetic transmission signals as height field components with a fourth intensity equal to the second intensity.

* * * * *